United States Patent [19]
Klaassen et al.

[11] Patent Number: 5,877,911
[45] Date of Patent: Mar. 2, 1999

[54] MAGNETO-RESISTIVE HEAD PRE-AMPLIFYING CIRCUIT FOR AVOIDING OUTPUT VOLTAGE TRANSIENTS

[75] Inventors: Klaas Berend Klaassen; Jacobus van Peppen, both of San Jose, Calif.

[73] Assignee: International Business Machines Corporation, Armonk, N.Y.

[21] Appl. No.: 614,570

[22] Filed: Mar. 13, 1996

[51] Int. Cl.$^6$ .............................. G11B 5/02; G11B 5/09; G11B 5/03
[52] U.S. Cl. .................... 360/67; 360/46; 360/66
[58] Field of Search .................. 360/66, 67, 46; 327/403, 325

[56] References Cited

U.S. PATENT DOCUMENTS

| | | | |
|---|---|---|---|
| 4,050,086 | 9/1977 | Harr | 360/66 |
| 4,523,238 | 6/1985 | Keel et al. | 360/46 |
| 4,533,965 | 8/1985 | Steinbaugh | 360/62 |
| 4,706,138 | 11/1987 | Jove et al. | 360/67 |
| 4,712,144 | 12/1987 | Klaassen | 360/67 |
| 4,769,724 | 9/1988 | Kusunoki et al. | 360/61 |
| 4,786,993 | 11/1988 | Jove et al. | 360/67 |
| 4,879,610 | 11/1989 | Jove et al. | 360/67 |
| 5,032,935 | 7/1991 | Jove et al. | 360/67 |
| 5,122,915 | 6/1992 | Klein et al. | 360/113 |
| 5,168,395 | 12/1992 | Klaassen et al. | 360/46 |
| 5,241,429 | 8/1993 | Holsinger | 360/46 |
| 5,257,146 | 10/1993 | Price, Jr. et al. | 360/67 |
| 5,309,298 | 5/1994 | Klaassen et al. | 360/67 |
| 5,548,453 | 8/1996 | Sasaki et al. | 360/67 |
| 5,619,386 | 4/1997 | Voorman et al. | 360/67 |
| 5,717,536 | 2/1998 | Jung et al. | 360/67 |

OTHER PUBLICATIONS

K. B. Klaassen, Magnetic Recording Channel Front–Ends, IEEE Transactions on Magnetics, vol. 27, No. 6, Nov. 1991, pp. 4503–4508.

K. B. Klaassen & J. C. L. van Peppen, Read/Write Amplifier Design Considerations for MR Heads, IEEE Transactions on Magnetics, vol. 31, No. 2, Mar. 1995, pp. 1056–1061.

Silicon Systems, A TDK Group Company, Integrated Circuits for Storage Products, 1993 Data Book, MR Head Read/Write Deivce, pp. 1–87to1–95, Jan. 1993.

Kubota, Circuit for Reduction of Write Recovery Time on Hand Disk Drive, IBM–TDB vol. 35 No.7, pp. 75–76, Dec. 1992.

*Primary Examiner*—Aristotelis M. Psitos
*Assistant Examiner*—Regina Y. Neal
*Attorney, Agent, or Firm*—Khanh Q. Tran

[57] ABSTRACT

A circuit is disclosed for pre-amplifying signals from an MR sensor in a disk drive without producing output voltage transients as the MR head changes its operational mode. In one preferred embodiment, the circuit includes a bias current source, an input stage, and a voltage clamp across the inputs of the OTA of the input stage. The input stage remains active in all modes of the MR head to avoid transients generated by the thermal responses of the MR sensor. In a second embodiment, the circuit allows the current from a first current source to bypass the input stage and flows directly to the MR sensor in write or idle mode. The bias current remains generally constant in all modes, thus avoiding output transients. In the third embodiment, upon switching to read state, the MR sensor is biased with an additional current source to quickly heat up the sensor. Upon reaching the normal read-mode temperature, the additional current is cut off and the sensor is again biased with only the first current source, thus avoiding voltage transients at the output of the circuit.

4 Claims, 6 Drawing Sheets

MAGNETO-RESISTIVE HEAD PRE-AMPLIFYING CIRCUIT FOR AVOIDING OUTPUT VOLTAGE TRANSIENTS

FIELD OF THE INVENTION

This invention relates to data recording disk drives. In particular, the invention relates to circuits for avoiding voltage transients at the output of a magneto-resistive head pre-amplifier used in data recording disk drives.

BACKGROUND OF THE INVENTION

Disk drives are information storage devices that include at least one rotatable disk with concentric data tracks containing the information, and one or more magnetic heads (or transducers) for reading data from and writing data to the data tracks. The data read by a magnetic head are further amplified by a pre-amplifying circuit before they are used by other parts of the disk drive system. In advanced disk drives, magneto-resistive (MR) heads are used for reading and writing data. An MR head generally includes an MR read element or sensor for reading data from the data tracks and an inductive write coil for writing data to the data tracks.

In order to guide the MR head over a data track while the disk is rotating, servo sectors are placed in the track along with data sectors. These servo sectors are read by the same MR sensor that reads the data sectors. The presence of the servo sectors makes it necessary to interrupt the writing during write cycles of the MR head as the head passes over a servo sector to allow the head to read the sector. Furthermore, with the disk rotating at a very high speed, it is crucial that the MR head be ready for reading data almost immediately after it is switched from write or idle mode to read mode, to avoid skipping portions of the track. Typically, it is desirable that the delay be less than 1 microsecond. Such a short duration, however, is difficult to achieve in existing prior art pre-amplifying circuits where an MR head is used. The thermal response of the MR sensor, due to the variation in the MR sensor bias current as the MR head mode changes, prevents the MR sensor from reaching steady-state until several microseconds after the MR head changes its operational state.

Pre-amplifying circuits for MR heads are described, for example, in U.S. Pat. Nos. 5,122,915 and 5,032,935. Due to the thermal response problem described above, the prior art pre-amplifying circuits typically generate undesirable transient voltages at their outputs as the MR head switches from write or idle mode to read mode. These transients result because the MR sensor is biased with a different current in each operational state.

Normally, the MR sensor is not biased when the MR head is in write mode to avoid overdriving the amplifying circuit, or in idle mode to save power. Such overdriving is caused mainly by the capacitance coupling between the MR sensor and the write coil of the MR head. When the MR head is in write or idle mode, the amplifier coupled to the MR sensor is usually switched off. Upon the MR head switching to read mode, the MR sensor is again biased with a DC current. This bias current causes the temperature of the MR sensor to rise from its value when the MR head was in write or idle mode until the steady-state temperature is achieved. The temperature rise results in a change in the MR sensor resistance, which depends on the temperature coefficient of the MR sensor. The variation in the MR sensor resistance in turn produces a transient voltage at the output of the read-back pre-amplifying circuit, thus preventing the MR head from properly reading data for several microseconds immediately after the MR head switches to read state.

Therefore, there remains a need for a MR head pre-amplifying circuit that does not generate voltage transients at its output as the MR head switches among its operational modes.

SUMMARY OF THE INVENTION

The invention is a pre-amplifying circuit for use with an MR sensor included in an MR head, without producing output voltage transients as the MR head changes its operational state. The MR head is used in a data recording disk drive for reading data from and writing data to a disk surface. In a preferred embodiment of the invention, the circuit includes a current source for supplying a bias current to the MR sensor and an input stage coupled between the current source and the MR sensor. The input stage includes an operational transconductance amplifier (OTA) and an input transistor where the base of the input transistor is biased by the output of the OTA in a feedback loop. The input stage is maintained active during the idle, write, and read modes of the MR head in order to have a generally constant bias current through the MR sensor. As a result, transient voltages at the output of the pre-amplifying circuit, which are caused by thermal response of the MR sensor to bias current changes, are avoided.

In addition, a clamping means is provided across the input terminals of the OTA to prevent driving the input transistor into saturation and overdriving the OTA in the write mode of the MR head. This overdriving is due to the capacitive coupling between the MR sensor and the write coil of the MR head. The clamping means may be a pair of inversely coupled diodes.

In the second preferred embodiment, the circuit does not have a clamping means across the OTA input, but includes means for allowing the current from a first current source to bypass the input transistor when the MR head is in write or idle mode. It further includes switches for turning off the input transistor and the OTA under certain conditions. While the MR head is in read mode, the MR sensor is biased with the current of the first current source. As the MR head goes into write or idle mode, the switches are activated to turn off the input transistor and OTA. The current from the first current source now bypasses the input transistor and flows directly to the MR sensor. Since the MR sensor bias current remains generally constant in all operational modes of the MR head, the thermal response problem and resulting voltage transients are avoided.

The second preferred embodiment has an advantage over the first preferred embodiment in that no clamping means is required for the OTA since there is no risk of overdriving the input transistor and the OTA. On the other hand, the second embodiment results in an increased power dissipation during write and idle modes because the bias current is always present at the MR sensor.

In the third preferred embodiment of the invention, the circuit is designed to eliminate output voltage transients while at the same time avoiding an increased power dissipation at the MR sensor. The circuit therefore includes a second current source and switches for controlling the first and second current sources as the MR head is in different states. When the MR head is in read mode, the switches and the bypass means operate such that the MR sensor is biased with only the current from the first current source, which flows through the input transistor. When the MR head goes into to write or idle mode, the switches are activated so that both of the current sources are turned off, and the input transistor is in off-state. No bias current flows through the MR sensor in this state of the circuit.

As the MR head returns to read mode, the two current sources are first switched on. Since the input transistor is still in off-state, the current from the first current source flows directly to the MR sensor through the bypass means. The MR sensor is now biased with the combined current from the first and second current sources. This increased current enables the MR sensor to be heated up more quickly than it would be with only the current from the first current source. Upon the MR sensor reaching a temperature equal to the final read-mode temperature, the switches are activated to turn off the second current source and put the input transistor in active state. The MR sensor is again biased with only the current of first current source which flows through the input transistor. Thus, the temperature of the MR sensor and the sensor resistance remain substantially constant throughout the read cycle of the MR head. Consequently, transient voltages at the output of the pre-amplifying circuit are avoided.

Moreover, power dissipation at the MR sensor is significantly lower as compared to the other embodiments because the increased current through the MR sensor is maintained only for a short time sufficient to bring the temperature of MR sensor to its steady-state value.

For a fuller understanding of the present invention, reference is made to the following detailed description taken in conjunction with the accompanying drawing.

DETAILED DESCRIPTION

Prior Art

Figure 1:
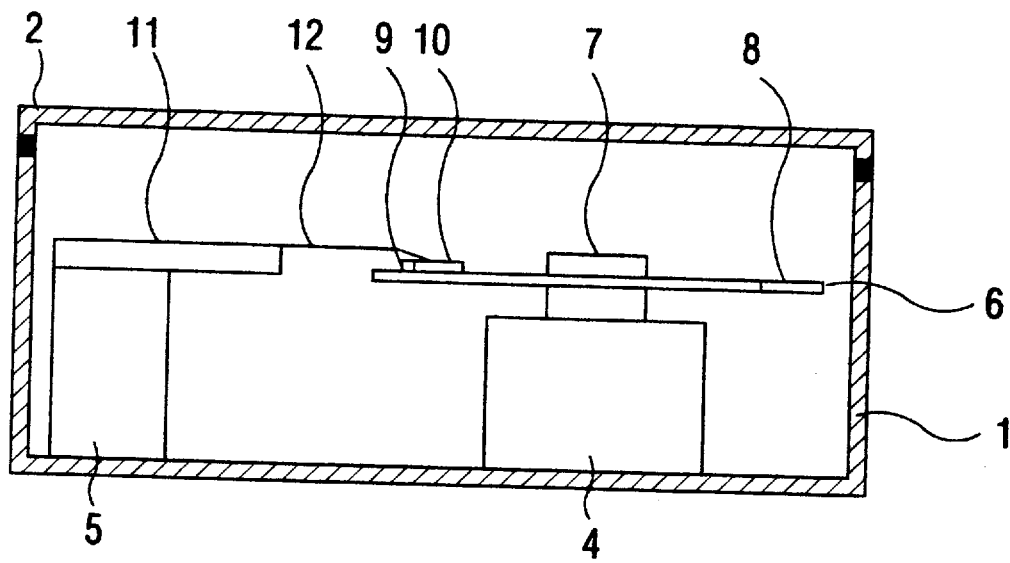
FIG. 1 is a simplified diagram of a prior art data recording disk drive.

Although the MR head pre-amplifying circuits of the present invention will be described as being used in a data recording disk storage system, as shown in FIG. 1, the invention is also applicable to other data recording systems, such as a compact disk data recording system or a magnetic tape recording system.

Referring to FIG. 1, there is illustrated in sectional view a schematic of a prior art disk drive of the type to which the pre-amplifying circuit of the invention is applicable. The disk drive comprises a base 1 to which are secured a disk drive motor 4, an actuator 5, and a cover 2. The base 1 and cover 2 provide a substantially sealed housing for the disk drive. A magnetic recording disk 6 is connected to drive motor 4 by means of hub 7 to which it is attached for rotation by the drive motor 4. Magnetic recording disk 6 has a data surface 8 for data to be read from and written to. A read/write head or transducer 9 is formed on the trailing end of a carrier, such as a slider 10. Slider 10 may be of an air-bearing type or a contact recording type. Head 9 may be an inductive read/write transducer or a magneto-resistive (MR) head which includes an inductive write coil and a magneto-resistive (MR) read sensor. The slider 10 is connected to the actuator 5 by means of a rigid support arm 11 and a flexible suspension 12. The suspension 12 provides a biasing force which urges the slider 10 onto the data surface 8 of the recording disk 6. During operation of the disk drive, the drive motor 4 rotates the disk 6 at a constant speed, and the actuator 5, which is typically a linear or rotary voice coil motor (VCM), moves the slider 10 generally radially across the data surface 8 so that the read/write head may access different data tracks on disk 6.

Figure 2:
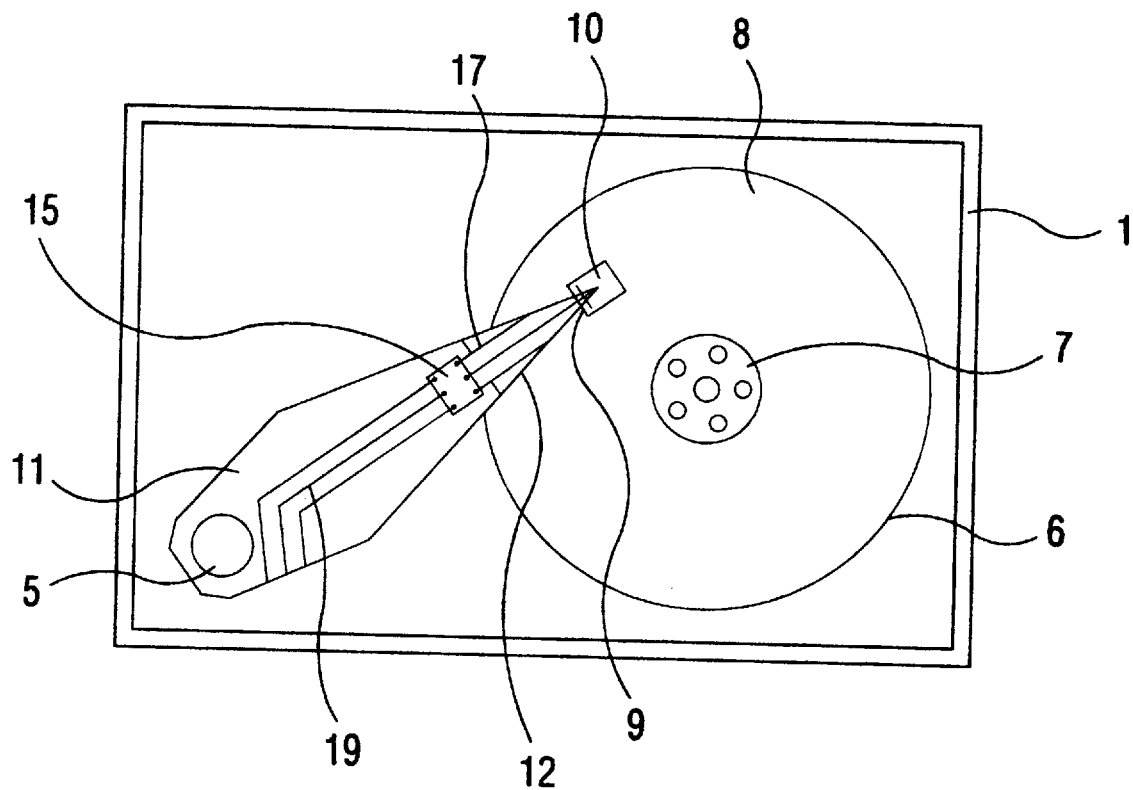
FIG. 2 is a top view of the disk drive of FIG. 1 with the cover removed.

FIG. 2 is a top view of the interior of the disk drive with the cover 2 removed, and illustrates in better detail arm 11 and suspension 12. Typically, the data detected from disk 6 by the head 9 is amplified and processed into a data read-back signal by circuitry in an electronics module 15 located on arm 11. This module can also be placed on the side of arm 11. The signal travels between head 9 and electronics module 15 through electrical conductors 17. The electronics module 15 communicates with the rest of the disk drive system by electrical conductors 19. It should be apparent that a disk storage system may contain a large number of magnetic disks 6, actuators 5, sliders 10, heads 9, and electronics module 15. Each electronics module may include one or more pre-amplifying circuits of the present invention.

Figure 3:
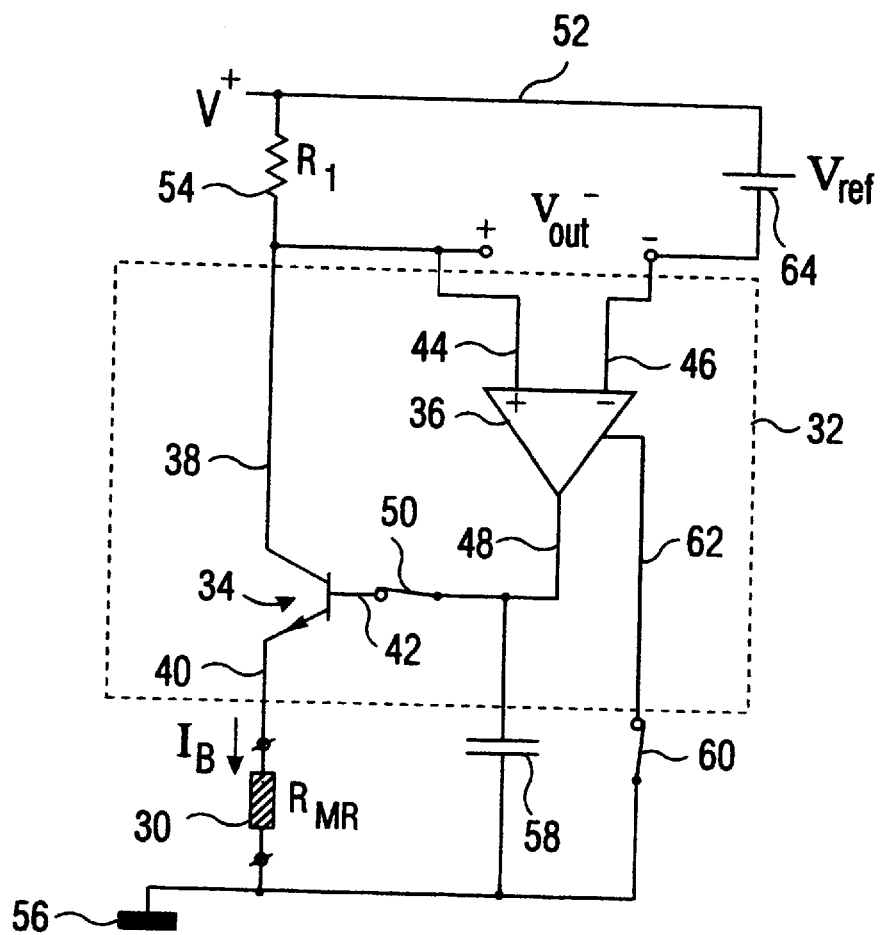
FIG. 3 is a diagram of a typical prior art MR head pre-amplifying circuit.

FIG. 3 shows the diagram for a typical prior art pre-amplifying circuit used in a data recording disk drive employing MR heads. The circuit has an input stage 32 which includes an input transistor 34 connected in a feed-back loop with an operational transconductance amplifier (OTA) 36. The transistor 34 has a collector 38, emitter 40, and base 42. Collector 38 is coupled to the input 44 of the OTA 36. Output 48 of the OTA 36 is coupled to base 42 of the transistor 34, through a switch 50 which is used for turning the input transistor 34 on and off. Collector 38 is also coupled to a voltage rail 52 through a current-limiting resistor 54 (R1). The MR sensor 30 of an MR head (not shown) is connected between the emitter 40 of transistor 34 and ground 56.

A capacitor 58 is coupled between output 48 of the OTA 36 and ground 56 to create a dominant pole in the feedback loop. Switch 60 is connected to the tail-current control input 62 of the OTA 36 for turning the OTA 36 on and off. A reference voltage source 64 ($V_{ref}$) is coupled between the inverting input 46 of OTA 36 and the voltage rail 52. The reference voltage 64 and resistor 54 (R1) determine the bias current $I_B$ through the MR sensor 30, where $I_B = V_{ref}/R1$.

While the MR head is in write mode, the input stage 32 of the amplifier is switched off by opening switch 50 to disconnect base 42 of transistor 34 from capacitor 58, thus switching off the MR sensor bias current coming from emitter 40 of transistor 34. Also, switch 60 is opened to turn off the OTA 36 and reduce the current at the OTA output 48 to zero. As a result, capacitor 58 can not charge or discharge during the write mode of the MR head, and maintains the same voltage level as when the MR head was in read mode. Upon the MR head switching back to read mode, switches 50 and 60 are then closed.

Figure 4:
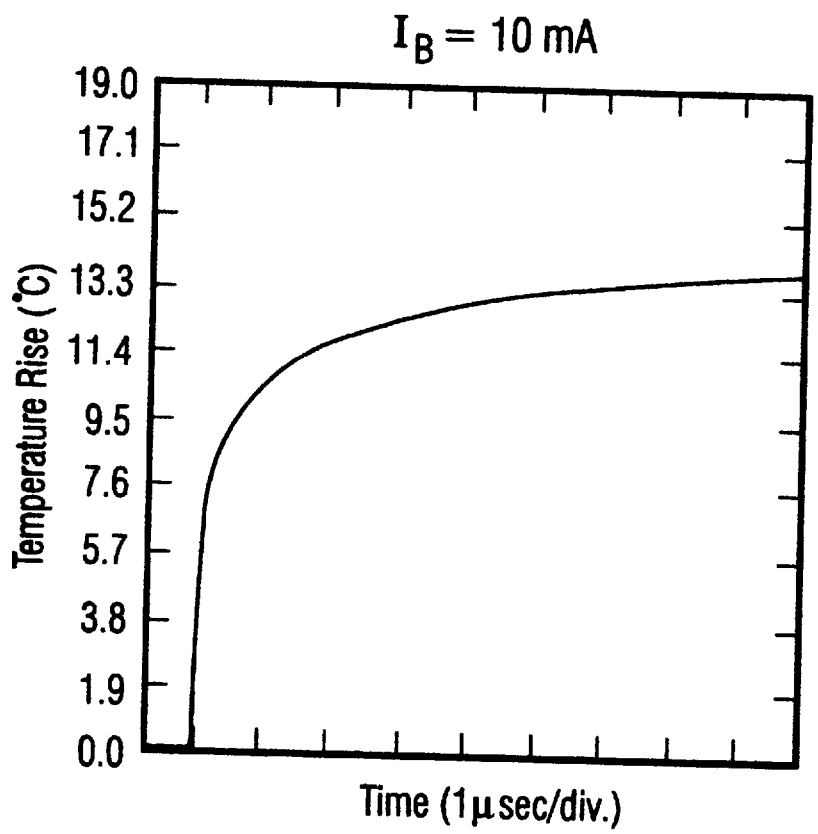
FIG. 4 shows the typical relationship between the temperature rise of a MR head and the MR head bias current.

Ideally, the circuit must be in a steady-state immediately after returning to read mode and be ready for reading data because the MR sensor 30 is now in exactly the same biasing condition as it was before the pre-amplifier was switched off. However, this is not the case in practice since the resistance of MR sensor 30 has changed due to the cooling of the MR sensor during the time it was not biased. To achieve steady-state again, the MR sensor 30 must first be allowed to heat up to the previous read-mode temperature. This heating-up, however, results in a voltage transient at the circuit output, thus preventing the MR head from properly reading data during this period. FIG. 4 illustrates the typical relationship between the temperature rise of an MR sensor and its bias current.

Preferred Embodiments

Figure 5:
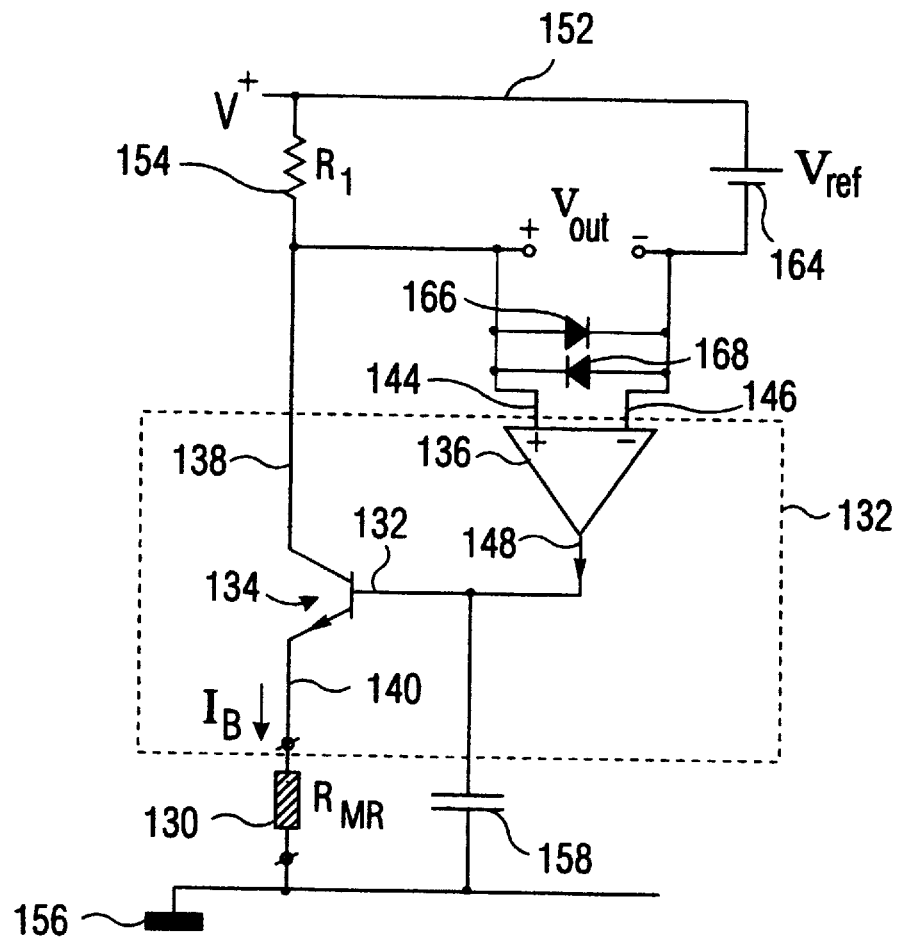
FIG. 5 is a diagram of the first embodiment for the MR head pre-amplifying circuit in accordance with the present invention.

FIG. 5 is a diagram for the first embodiment of the MR head pre-amplifying circuit in accordance with the present invention. The circuit has an input stage 132 which includes an input transistor 134 connected in a feedback loop with an operational transconductance amplifier (OTA) 136. The transistor 134 has a collector 138, emitter 140, and base 142. Collector 138 is connected to input 144 of the OTA 136. Output 148 of the OTA 136 is coupled to base 142 of the transistor 134. Collector 138 is also coupled to voltage rail 152 through a current-limiting resistor 154. An MR sensor 130 is connected between the emitter 140 of transistor 134 and ground 156. A capacitor 158 is connected between output 148 of the OTA 136 and ground 156 to create a dominant pole in the feedback loop. A pair of diodes 166 and 168, acting as a voltage clamp, is inversely connected between the input terminal 144 and the inverting input terminal 146 of the OTA 136. The diodes 166 and 168 prevent the input transistor 134 and the OTA 136 from being overdriven by voltage spikes which are caused by the parasitic capacitive coupling between the MR sensor 130 and the write coil of the MR head (not shown).

The input stage 132 provides a bias current $I_B$ from the emitter 140 of the input transistor 134 to the MR sensor 130. To maintain a generally constant bias current $I_B$ through the MR sensor 130, the input stage 132 is kept active during the write and idle modes of the MR head, in addition to being active in read mode. As a result, the bias current $I_B$ is always present in the MR sensor 130, and transient voltages at the output of the pre-amplifying circuit, caused by variations in the MR sensor 130 resistance, are avoided.

Figure 6:
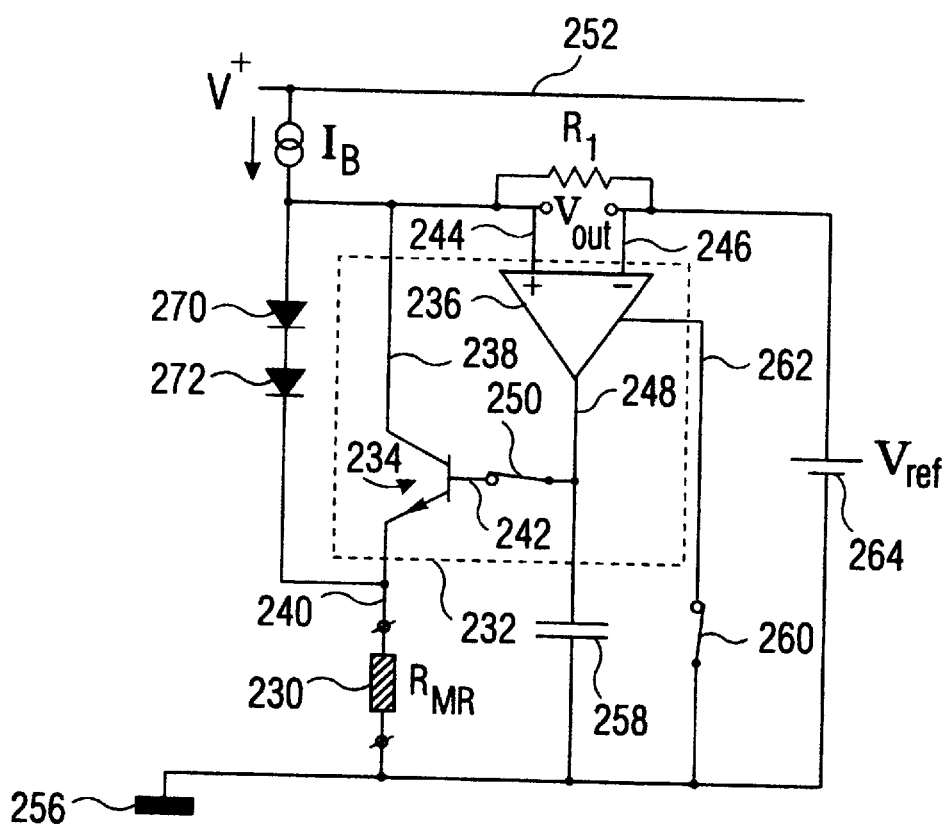
FIG. 6 is a diagram of the second embodiment for the MR head pre-amplifying circuit in accordance with the present invention.

Referring to FIG. 6, a diagram for the second embodiment of the MR head pre-amplifying circuit is shown. Like the first embodiment, the circuit has an input stage 232 which includes an input transistor 234 connected in a feedback loop with an operational transconductance amplifier (OTA) 236. The transistor 234 has a collector 238, emitter 240, and base 242. Collector 238 is connected to input 244 of the OTA 236 and also to a voltage rail 252. Output 248 of the OTA 236 is coupled to base 242 of the transistor 234 through a switch 250. The switch 250 allows transistor 234 to be turned on or off. The MR sensor 230 is connected between the emitter 240 of transistor 234 and ground 256. A capacitor 258 is connected between output 248 of the OTA 236 and ground 256 to create a dominant pole in the feedback loop.

A second switch 260 is connected to the tail-current control input 262 of the OTA 236 for switching the OTA on and off. The diodes 270 and 272 are connected in series between collector 238 and emitter 240 of the transistor 234 to provide a bypass for current $I_B$ to the MR sensor 230 when the MR head is in write or idle mode. Reference voltage source 264 ($V_{ref}$) is provided between the OTA inverting input 246 and ground 256 for controlling diodes 270 and 272.

While the MR head is in the read mode, the reference voltage $V_{ref}$ is chosen sufficiently low to keep the diodes 270 and 272 from conducting. Typically, $V_{ref}$ must be less than the sum of two diode voltages (1.4 Volts) and the voltage across the biased MR sensor. The OTA feedback loop is now operational, holding the DC voltage across the OTA input terminals 244 and 246 to zero. Since diodes 270 and 272 are off, the current $I_B$ flows to the MR sensor 230 through transistor 234. When the MR head switches to write or idle mode, the OTA 236 is turned off by opening switch 260 to remove the OTA tail current. At the same time, the input transistor 234 is switched off by opening switch 250 to disconnect base 242 from the OTA 236. While the voltage of capacitor 258 is held at its read-mode value, the voltage at collector 238 of transistor 234 will rise instantly until the diodes 270 and 272 become conductive. Because both the input transistor 234 and the OTA 236 are off, the current $I_B$ will bypass transistor 234 and flow directly to the MR sensor 230 through diodes 270 and 272.

Since the same current $I_B$ is present in the MR sensor 230 regardless of the state of the MR head, variations in the resistance of the MR sensor 230 and resulting output transients are avoided. In addition, because the input stage 232 gain is reduced to less than unity when the MR head is in write or idle state, neither the OTA 236 nor the transistor 234 is overdriven by the parasitic capacitive coupling between the MR sensor 230 and the write coil of the MR head. A voltage clamp for the OTA inputs is thus no longer necessary. The second preferred embodiment, however, results in higher power dissipation than the first preferred embodiment because the current $I_B$ is always present at the MR sensor 230.

Figure 7:
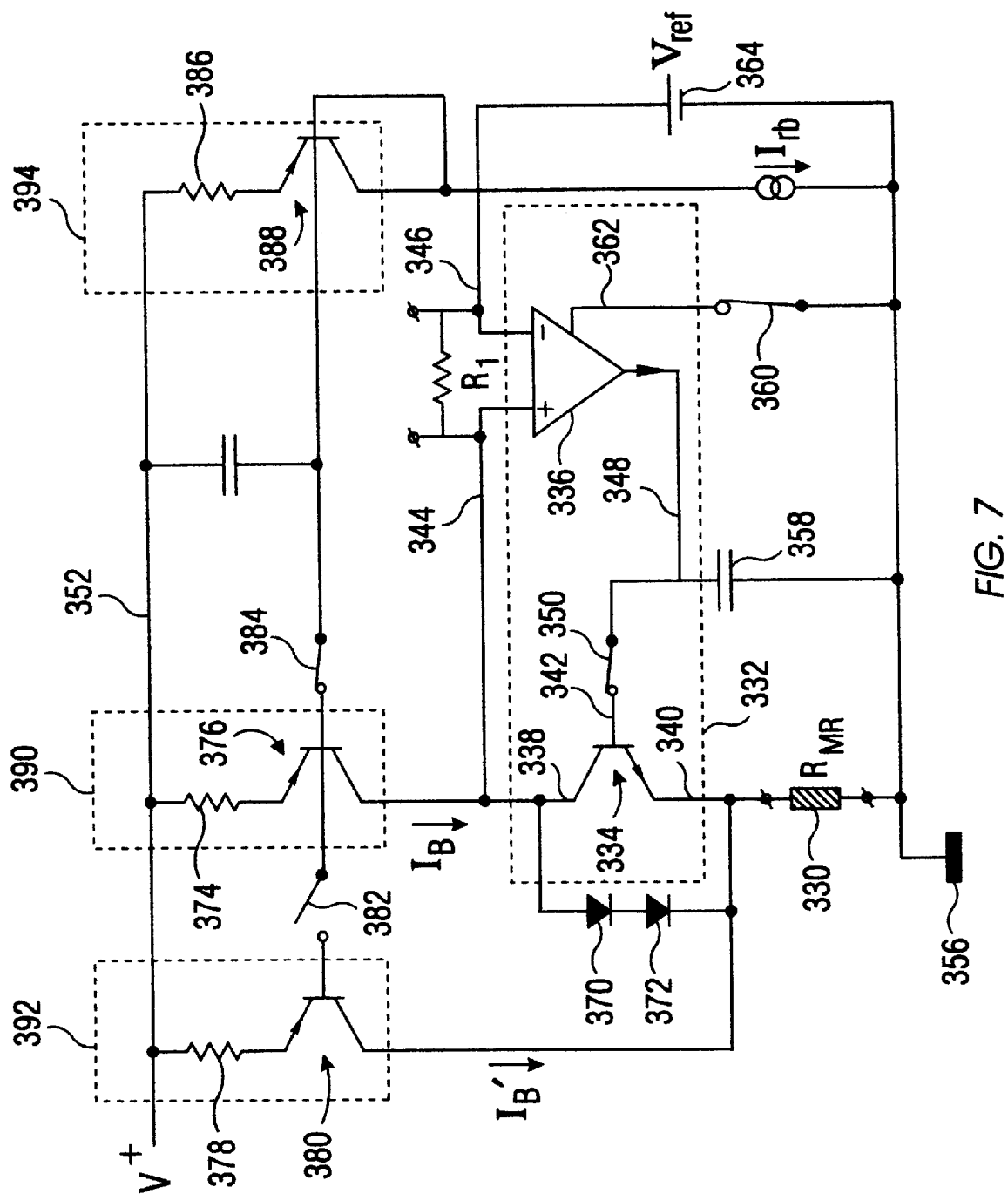
FIG. 7 is a diagram of the third embodiment for the MR head pre-amplifying circuit of the present invention when the MR head is in steady-state read mode.

FIG. 7 illustrates the diagram for the third preferred embodiment of the the MR head pre-amplifying circuit in accordance with the present invention. Similar to the second embodiment, the circuit has an input stage 332 which includes an input transistor 334 connected in a feedback loop with an OTA 336. The input transistor 334 is controlled by switch 350 coupled to transistor base 342, while the OTA 336 is controlled by switch 360. Diodes 370 and 372 are connected between collector 338 and emitter 340 of transistor 334 as a bypass to transistor 334. In addition, the circuit of FIG. 7 has a first current source 390 which includes transistor 376 and resistor 374, for providing current $I_B$ to the input transistor 334. Transistor 380 and resistor 378 make up a second current source 392 for providing current $I_B$ to the MR sensor 330. Switches 384 and 382 are connected to the bases of the transistors 376 and 380 for controlling the current sources 390 and 392, respectively.

In addition, reference voltage source 364 ($V_{ref}$) is provided between the OTA inverting input 346 and ground 356 for controlling diodes 370 and 372. A third current source 394 provides a bias current for controlling transistors 376 and 380. The current sources 390 and 392 may then be turned off by removing the bias current using switches 384 and 382, respectively.

While the MR head is in read mode, switches 350, 360, and 384 are closed, and switch 382 is open. $V_{ref}$ is chosen to be lower than the sum of the two diode voltages and the DC voltage across the MR sensor 330 to keep the diodes 370 and 372 from conducting. In this state, the circuit operates similarly to the circuit of the second preferred embodiment.

As the MR head goes into write or idle mode, the switches are changed at the same time: switches 350, 360, and 384 are opened, and switch 382 is closed. Since transistors 376 and 380 are in off-state, both the first and second current sources are turned off. Also, because switches 350 and 360 are open, both the input transistor 334 and the OTA 336 are inactive. No bias current flows through the MR sensor 330, and the voltage of capacitor 358 is preserved at its read-state value.

Upon the MR head returning to read mode, only switch 384 is closed initially to enable the two current sources 390 and 392. Since the input transistor 334 is still off, the current $I_B$ from the first current source 390 bypasses transistor 334 and flows directly to the MR sensor 330 through diodes 370 and 372. The MR sensor 330 is then biased with the sum of current $I_B$ and $I_{B'}$ from the current sources 390 and 392, respectively. This increased current enables the MR sensor 330 to be heated up more quickly than with only the current $I_B$ from the first current source 390.

At the moment the temperature of the MR sensor 330 reaches a temperature equal to the final temperature when the MR head is read mode, i.e., where the MR sensor is biased with current $I_B$ alone, switch 382 is opened and switches 350 and 360 are closed. Input transistor 334 now becomes active, at the same time, the second current source 392 is disabled because transistor 380 is off. The MR sensor is again biased with only the current of first current source 390, thus placing the circuit in its normal read mode. Because the MR sensor 330 is already at its final read-mode temperature, no thermal transients will appear at the circuit output resulting from the change of the MR state.

The thermal recovery time $T_d$, i.e., the period between the time when switch 384 is closed and the time when switch 382 is opened after the MR head returns to read mode, can be approximated using the thermal-time constants of the MR head. For a given technology used in manufacturing the MR head, the thermal-time constants depend on the geometry and materials of the head, but do not vary substantially.

As an example, consider an MR head stripe which has an MR sensor, lead, aluminum, and shield materials. The temperature rise $T_s$ of an MR head stripe can be approximated by:

$$T_s = P(R_{sl} + R'_{ls1}(1 - e^{-t/\tau_1})) \quad (1)$$

where P being the power dissipated in the MR head, $\tau_1$ being the lead thermal-time constant, $R_{sl}$ being the thermal resistance between the MR sensor stripe and the lead layers, $R_{ls1}$ being the thermal resistance between the lead layers and the shield.

The temperature of the lead is given by:

$$T_1 = PR'_{ls1}(1 - e^{-t/\tau_l}) \quad (2)$$

At a nominal current $I_B$, the final temperature would be:

$$T_1 = R_{MR} I_B^2 R'_{ls1} \quad (3)$$

This temperature is reached with the bias current $I_B + I'_B$ after time $T_d$. Thus, $$T_d = \tau_1 \ln \frac{(I_B + I_{B'})^2}{(I_B + I_{B'})^2 - I_B^2} = -\tau_1 \ln\left(1 - \left(\frac{I_B}{I_B + I_{B'}}\right)^2\right) \quad (4)$$

Assuming $I_B = I_{B'}$, i.e., the bias current is temporarily doubled during the temperature recovery period, then $T_d = 0.29\tau_1$.

For the MR head of the example, $\tau_1$ is measured to be 1 microsecond, therefore, $T_d = 290$ nsec. As a result, the MR head is ready for reading data in 290 nsec after returning to read state, instead of several microseconds in a normal case. Generally, the larger the extra bias current $I_{B'}$, the shorter the thermal recovery time $T_d$ will be.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A circuit for pre-amplifying data signals from a magneto-resistive (MR) sensor included in an MR head capable of being in read, write, or idle mode, the circuit comprising:

a first current source for supplying a bias current to the MR sensor;

an input stage coupled between the first current source and the MR sensor, the input stage having an input transistor and an operational transconductance amplifier (OTA) connected in a feedback loop, the OTA having an input, an inverting input, a tail-current control input, and an output, the base of the input transistor being biased by the output of the OTA, the collector of the input transistor being coupled to the input of the OTA, and the emitter of the input transistor being coupled to the MR sensor;

a reference voltage source coupled between the OTA inverting input and ground;

current bypass means coupled between the collector and emitter of the input transistor for maintaining the bias current generally constant as the MR head is in different operating modes, the bypass means including a pair of diodes connected in series;

a first switching means coupled between the output of the OTA and the base of the input transistor for controlling the input transistor; and a second switching means coupled between the tail-current control input of the OTA and the ground for controlling the OTA;

whereby when the MR head is in read mode, the reference voltage source is set less than the sum of two diode voltages and the voltage across the MR sensor, the first and second switching means are closed, and the MR sensor is biased with the current from the first current source that flows through the input transistor, and when the MR head is in write or idle mode, the second switching means is opened to turn off the OTA, the first switching means is opened to turn off the input transistor, the current bypass means is enabled, and the current from the first current source then flows directly to the MR sensor through the current bypass means, thereby maintaining the MR sensor bias current generally constant as the mode of the MR head changes.

2. An MR head-electronics assembly for a data recording disk drive of the type having a rotatable disk with a data surface, an actuator for moving the MR head generally radially relative to the data surface, the MR head-electronics assembly comprising:

an arm-suspension assembly having two ends, the actuator being attached to one end of the arm-suspension assembly;

an MR head capable of being in read, write, or idle mode for reading data from and writing data to the data surface, the MR head being attached to the other end of the arm-suspension assembly and having an MR sensor for reading data signals from the data surface;

an electronics module for processing data read from or written to the data surface, the electronics module having a circuit for pre-amplifying data signals read by the MR sensor, the circuit comprising:
- (a) a first current source for supplying a bias current to the MR sensor;
- (b) an input stage coupled between the first current source and the MR sensor, the input stage having an input transistor and an operational transconductance amplifier (OTA) connected in a feedback loop, the OTA having an input, an inverting input, a tail-current control input, and an output, the base of the input transistor being biased by the output of the OTA, the collector of the input transistor being coupled to the input of the OTA, and the emitter of the input transistor being coupled to the MR sensor;
- (c) a reference voltage source coupled between the OTA inverting input and ground;
- (d) current bypass means coupled between the collector and emitter of the input transistor for maintaining the bias current generally constant as the MR head is In different operating modes, the bypass means including a pair of diodes connected in series;
- (e) a first switching means coupled between the output of the OTA and the base of the input transistor for controlling the input transistor; and
- (f) a second switching means coupled between the tail-current control input of the OTA and the ground for controlling the OTA;

whereby when the MR head is in read mode, the reference voltage source is set less than the sum of two diode voltages and the voltage across the MR sensor, the first and second switching means are closed, and the MR sensor is biased with the current from the first current source that flows through the input transistor, and when the MR head is in write or idle mode, the second switching means is opened to turn off the OTA, the first switching means is opened to turn off the input transistor, and the current bypass means is enabled, the current from the first current source then flows directly to the MR sensor through the current bypass means, thereby maintaining the MR sensor bias current generally constant as the mode of the MR head changes.

3. An MR head-slider-electronics assembly for a data recording disk drive of the type having a rotatable disk with a data surface, comprising:

a slider maintained in operative relationship with the data surface when the disk is rotating;

an MR head capable of being in read, write, or idle mode for reading data from and writing data to the data surface, the MR head being attached to the slider and having an MR sensor for reading data signals from the data surface;

an electronics module for processing data read from or written to the data surface by the MR head, the electronics module having a circuit for pre-amplifying data signals read by the MR sensor, the circuit comprising:
- (a) a first current source for supplying a bias current to the MR sensor;
- (b) an input stage coupled between the first current source and the MR sensor, the input stage having an input transistor and an operational transconductance amplifier (OTA) connected in a feedback loop, the OTA having an input, an inverting input, a tail-current control input, and an output, the base of the input transistor being biased by the output of the OTA, the collector of the input transistor being coupled to the input of the OTA, and the emitter of the input transistor being coupled to the MR sensor;
- (c) a reference voltage source coupled between the OTA inverting input and ground;
- (d) current bypass means coupled between the collector and emitter of the input transistor for maintaining the bias current generally constant as the MR head is in different operating modes, the bypass means including a pair of diodes connected in series;
- (e) a first switching means coupled between the output of the OTA and the base of the input transistor for controlling the input transistor; and
- (f) a second switching means coupled between the tail-current control input of the OTA and the ground for controlling the OTA;

whereby when the MR head is in read mode, the reference voltage source is set less than the sum of two diode voltages and the voltage across the MR sensor, the first and second switching means are closed, and the MR sensor is biased with the current from the first current source that flows through the input transistor, and when the MR head is in write or idle mode, the second switching means is opened to turn off the OTA, the first switching means is opened to turn off the input transistor, the current bypass means is enabled, and the current from the first current source then flows directly to the MR sensor through the current bypass means, thereby maintaining the MR sensor bias current generally constant as the mode of the MR head changes.

4. A data recording disk drive comprising:

a disk with a data surface of concentric data tracks;

means attached to the disk for rotating the disk about an axis generally perpendicular to the disk;

an arm-suspension assembly having two ends;

an MR head capable of being in read, write, or idle mode for reading data from and writing data to the data surface, the MR head being attached to one end of the arm-suspension assembly and having an MR sensor for reading data signals from the data surface;

an actuator attached to the other end of the arm-suspension assembly for moving the MR head generally radially relative to the data surface;

an electronics module for processing data read from or written to the data surface, the electronics module having circuit for pre-amplifying data signals read by the MR sensor, the circuit comprising:
- (a) a first current source for supplying a bias current to the MR sensor;
- (b) an input stage coupled between the first current source and the MR sensor, the input stage having an input transistor and an operational transconductance amplifier (OTA) connected in a feedback loop, the OTA having an input, an inverting input, a tail-current control input, and an output, the base of the input transistor being biased by the output of the OTA, the collector of the input transistor being coupled to the input of the OTA, and the emitter of the input transistor being coupled to the MR sensor;
- (c) reference voltage source coupled between the OTA inverting input and ground;
- (d) current bypass means coupled between the collector and emitter of the input transistor for maintaining the bias current generally constant as the MR head is in different operating modes, the bypass including a pair of diodes connected in series;
- (e) a first switching means coupled between the output of the OTA and the base of the input transistor for controlling the input transistor; and (f) a second switching means coupled between the tail-current control input of the OTA and the ground for controlling the OTA;

whereby when the MR head is in read mode, the reference voltage source is set less than the sum of two diode voltages and the voltage across the MR sensor, the first and second switching means are closed, and the MR sensor is biased with the current from the first current source that flows through the input transistor, and when the MR head is in write or idle mode, the second switching means is opened to turn off the OTA, the first switching means is opened to turn off the input transistor, the current bypass means is enabled, and the current from the first current source then flows directly to the MR sensor through the current bypass means, thereby maintaining the MR sensor bias current generally constant as the mode of the MR head changes.

* * * * *